United States Patent
Furukawa et al.

(10) Patent No.: US 8,451,390 B2
(45) Date of Patent: May 28, 2013

(54) PROJECTION STEREOSCOPIC DISPLAY

(75) Inventors: Akio Furukawa, Tokyo (JP); Yoshiro Takiguchi, Kanagawa (JP)

(73) Assignee: Sony Corporation (JP)

( * ) Notice: Subject to any disclaimer, the term of this patent is extended or adjusted under 35 U.S.C. 154(b) by 723 days.

(21) Appl. No.: 12/646,489

(22) Filed: Dec. 23, 2009

(65) Prior Publication Data

US 2010/0171890 A1   Jul. 8, 2010

(30) Foreign Application Priority Data

Jan. 7, 2009   (JP) ................................. 2009-001433

(51) Int. Cl.
*G02F 1/1335* (2006.01)

(52) U.S. Cl.
USPC .............. 349/15; 349/5; 349/6; 349/9; 353/7; 353/8; 353/30; 353/31; 353/20

(58) Field of Classification Search
USPC ....................................... 349/15, 5–9; 353/20
See application file for complete search history.

(56) References Cited

U.S. PATENT DOCUMENTS

| | | | | |
|---|---|---|---|---|
| 7,411,636 B2 * | 8/2008 | Abileah | ........................... | 349/15 |
| 7,931,376 B2 * | 4/2011 | Chen et al. | ...................... | 353/20 |
| 2005/0174543 A1 | 8/2005 | Bin | | |
| 2009/0103051 A1 * | 4/2009 | Hsu et al. | ........................... | 353/8 |
| 2009/0310086 A1 * | 12/2009 | Li | .................................. | 353/20 |

FOREIGN PATENT DOCUMENTS

| | | | |
|---|---|---|---|
| JP | 07-020431 | * | 1/1995 |
| JP | HEI 07-020431 A | | 1/1995 |
| JP | HEI 10-069012 A | | 3/1998 |
| JP | 10-148796 | | 6/1998 |
| JP | HEI 10-293545 A | | 11/1998 |
| JP | 2000-059821 | * | 2/2000 |
| JP | 2000-059821 A | | 2/2000 |
| JP | 2001-004957 | | 1/2001 |
| JP | 2002-139792 | | 5/2002 |
| JP | 2002-189194 | | 7/2002 |
| JP | 2003-05130 | | 1/2003 |
| JP | 2004-117676 | | 4/2004 |
| JP | 2007-524111 | | 8/2007 |
| JP | 2008-521064 | | 6/2008 |

OTHER PUBLICATIONS

Japanese Patent Office, Office Action issued in Patent Application JP 2009-001433, on Oct. 19, 2010.

* cited by examiner

*Primary Examiner* — Edward Glick
*Assistant Examiner* — Sang V Nguyen
(74) *Attorney, Agent, or Firm* — Sheridan Ross P.C.

(57) ABSTRACT

A projection stereoscopic display includes: a stereoscopic display optical system receiving linearly polarized light from the light source and displaying a first picture and a second picture both having binocular parallax by linearly polarized light with polarization directions orthogonal to each other, in which the stereoscopic display optical system includes: a reflective liquid crystal panel modulating and reflecting linearly polarized light from the light source in response to a picture signal, a first polarizing device splitting the first picture from reflected light from the reflective liquid crystal panel, a retardation device converting the polarization direction of the first picture into a direction orthogonal thereto, and a second polarizing device splitting the second picture from reflected light from the reflective liquid crystal panel, and superimposing the second picture on the first picture of which the polarization direction is converted by the retardation device.

5 Claims, 6 Drawing Sheets

PROJECTION STEREOSCOPIC DISPLAY

BACKGROUND OF THE INVENTION

1. Field of the Invention

The present invention relates to a projection stereoscopic display including an optical system which includes a reflective liquid crystal panel and a polarizer.

2. Description of the Related Art

There are projection stereoscopic displays providing independent images to the right eye and the left eye of a viewer, respectively, to allow stereoscopic vision using binocular parallax, and various systems of projection stereoscopic displays have been proposed. For example, two projection displays (projectors) are used to superimpose a right-eye picture and a left-eye picture with orthogonal polarization directions on each other and project them, and when the viewer wearing a pair of glasses which use polarizing plates with orthogonal polarization directions as right-eye and left-eye lenses views the pictures, the viewer are allowed to experience stereoscopic vision.

Moreover, for example, as described in Japanese Unexamined Patent Application Publication No. 2001-4957, there is a projection stereoscopic display in which a right-eye picture and a left-eye picture with orthogonal polarization directions are obtained from two reflective liquid crystal panels included in a single projector, and the pictures are spatially superimposed on each other by a reflective polarizer such as a polarizing beam splitter so as to allow stereoscopic display. In the system, stereoscopic display is achievable with one projector.

SUMMARY OF THE INVENTION

In the above-described stereoscopic display in related art, a polarizing beam splitter combines picture light reflected by one panel and picture light reflected by the other panel to allow stereoscopic display.

However, the polarizing beam splitter in such a stereoscopic display also has a function of distributing incident light from a light source to two reflective liquid crystal panels. Therefore, the incident light from the light source is necessary to be in a non-polarization state including equal amounts of polarized components which are orthogonal to each other. A non-polarized light source such as a lamp or light-emitting diode is favorably used.

However, in the case where a polarized light source such as a laser is used, it is necessary to convert light into a non-polarization state in advance, thereby the number of components and light loss increase. A laser light source has lower power consumption than a lamp or a light-emitting diode, and has a high light condensing property and extremely high color purity, so a projector with higher efficiency and a wide color gamut is achievable. Moreover, by the above-described projector using the reflective liquid crystal panels, high-definition and large-screen stereoscopic display is achievable at low cost. Therefore, an optical configuration in which a laser having linear polarization as a light source is usable as-is necessary.

It is desirable to provide a projection stereoscopic display using a linearly polarized light source and achieving stereoscopic display by a single projector using a reflective liquid crystal panel with a simple optical system.

According to an embodiment of the invention, there is provided a projection stereoscopic display including: a stereoscopic display optical system receiving linearly polarized light from the light source and displaying a first picture and a second picture both having binocular parallax by linearly polarized light with polarization directions orthogonal to each other. The stereoscopic display optical system includes: a reflective liquid crystal panel modulating and reflecting linearly polarized light from the light source in response to a picture signal, a first polarizing device splitting the first picture from reflected light from the reflective liquid crystal panel, a retardation device converting the polarization direction of the first picture into a direction orthogonal thereto, and a second polarizing device splitting the second picture from reflected light from the reflective liquid crystal panel, and superimposing the second picture on the first picture of which the polarization direction is converted by the retardation device.

In the projection stereoscopic display according to the embodiment of the invention, linearly polarized light from the light source passes through the first polarizing device and the second polarizing device to reach the reflective liquid crystal panel. The polarization direction of the reached linearly polarized light is modulated into polarization directions corresponding to the first picture for left eye and the second picture for right eye by the reflective liquid crystal panel, and then the linearly polarized light is reflected. The reflected light is polarization-split into the first picture and the second picture by the first and second polarizing devices, and the polarization direction of the first picture is converted into a direction orthogonal thereto by the retardation device (a $\lambda/2$ wave plate), and then the first picture is spatially superimposed on the second picture in the second polarizing device.

In the projection stereoscopic display according to the embodiment of the invention, as functions of the first polarizing device and the second polarizing device, only a function of polarization-splitting reflected light from the reflective liquid crystal panel and combining two kinds of pictures is necessary, and a function of distributing incident light to the reflective liquid crystal panel is not necessary. Therefore, a laser having a high light condensing property and low power consumption is usable as a linearly polarized light source with a simple optical system, and a projection stereoscopic display with higher efficiency and higher performance than that in related art is achievable by using the laser.

Other and further objects, features and advantages of the invention will appear more fully from the following description.

DETAILED DESCRIPTION OF THE PREFERRED EMBODIMENTS

Preferred embodiments will be described in detail below referring to the accompanying drawings. Descriptions will be given in the following order.

Figure 1:
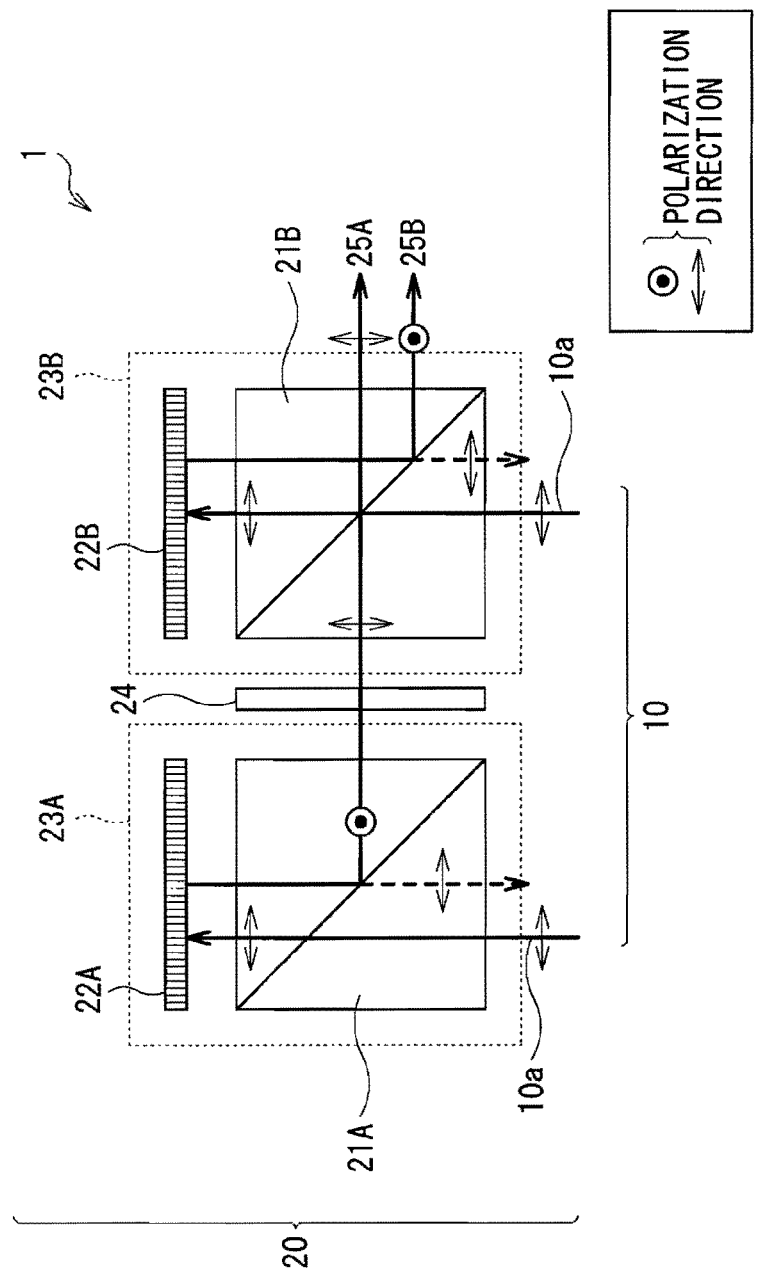
FIG. 1 is an illustration of a configuration of a projection stereoscopic display according to a first embodiment of the invention.

(1) First Embodiment: Example illustrating a basic configuration
(2) Comparative Example: Configuration example in the case where a laser is applied to a stereoscopic display optical system in related art
(3) Application Example: Example in which the basic configuration is applied to color display
(4) Second Embodiment: Example in which a first polarizing device is replaced with another polarizing device
(5) Modification 1: Example in which two reflective liquid crystal panels are integrated
(6) Modification 2: Example in which a first picture and a second picture have equal optical path lengths
(7) Modification 3: Example in which a picture is projected with circularly polarized light First Embodiment FIG. 1 illustrates a configuration of a projection stereoscopic display (hereinafter referred to as stereoscopic display) 1 according to a first embodiment of the invention. The stereoscopic display 1 stereoscopically displays a picture based on an input picture signal supplied from outside, and roughly includes a light source 10 and a stereoscopic display optical system 20.

The light source 10 is a laser (a LD or a solid-state laser), and laser light 10a from the light source 10 includes, for example, a linearly polarized component (a first linearly polarized component) in a direction parallel to a paper plane (in a direction indicated by arrows in the drawing).

The stereoscopic display optical system 20 includes a first modulation section 23A which is configured of a first polarizing beam splitter 21A and a first reflective liquid crystal panel 22A, and a second modulation section 23B which is configured of a second polarizing beam splitter 21B and a second reflective liquid crystal panel 22B. A $\lambda/2$ wave plate 24 as a retardation device is arranged between the first modulation section 23A and the second modulation section 23B. A projection lens and a screen (both not illustrated) are arranged on a picture emission side of the second polarizing beam splitter 21B in the second modulation section 23B.

The first polarizing beam splitter 21A and the second polarizing beam splitter 21B both have a configuration in which a dielectric multilayer film is bonded to an oblique surface of a right angle prism by coating, and have a function of reflecting a polarized component parallel to the oblique surface and allowing a polarized component not parallel to the oblique surface to pass therethrough. The laser light 10a having the first linearly polarized component enters into each of the first polarizing beam splitter 21A and the second polarizing beam splitter 21B.

The laser light 10a having passed through the first polarizing beam splitter 21a and the laser light 10a having passed through the second polarizing beam splitter 21B enter into the first reflective liquid crystal panel 22A and the second reflective liquid crystal panel 22B, respectively. The first reflective liquid crystal panel 22A and the second reflective liquid crystal panel 22B have a function of adjusting the polarization direction of incident light so as to correspond to, for example, a first picture for left eye and a second picture for right eye, respectively, and reflecting the incident light.

The $\lambda/2$ wave plate 24 has a function of converting a component having a polarization direction perpendicular to the paper plane (a second linearly polarized component) which is split from reflected light from the first reflective liquid crystal panel 22A by the first polarizing beam splitter 21A into a component having a polarization direction parallel to the paper plane (a first linearly polarized component).

In such a configuration, in the stereoscopic display 1 according to the embodiment, stereoscopic display is performed in the following manner. That is, in the stereoscopic display 1, the laser light 10a having the first linearly polarized component and having emitted from the light source 10 passes through the first polarizing beam splitter 21A and the second polarizing beam splitter 21B to reach the first reflective liquid crystal panel 22A and the second reflective liquid crystal panel 22B, respectively. In the first reflective liquid crystal panel 22A, the polarization direction of the incident laser light 10a is modulated into a polarization direction corresponding to, for example, the first picture for left eye, and the modulated light is reflected. The modulated reflected light is polarization-split by the first polarizing beam splitter 21A, and the second linearly polarized component is reflected by the first polarizing beam splitter 21A to be emitted as a first picture 25A. The first linearly polarized component of the reflected light passes through the first polarizing beam splitter 21A to be returned in a direction toward the light source 10. The first picture 25A emitted from the first polarizing beam splitter 21A is converted into the first linearly polarized component by the $\lambda/2$ wave plate 24, and then passes through the second polarizing beam splitter 21B.

On the other hand, in the second reflective liquid crystal panel 22B, the polarization direction of the incident laser light 10a is modulated into a polarization direction corresponding to, for example, the second picture for right eye, and then is reflected to the second polarizing beam splitter 21B. In the second polarizing beam splitter 21B, as in the case of the first polarizing beam splitter 21A, a second picture 25B for right eye having the second linearly polarized component is reflected, and the second picture 25B is superimposed on the first picture 25A and emitted. The first picture 25A and the second picture 25B are focused on a projection lens (not illustrated) to be projected on a screen. Then, when the pictures projected on the screen are viewed through a pair of polarized glasses, a stereoscopic picture is viewable.

Thus, in the stereoscopic display 1 according to the embodiment, as only linearly polarized light is used, the first picture for left eye and the second picture for right eye are allowed to be spatially superimposed on each other and projected. Therefore, a laser having a high light condensing property and low power consumption is usable as a light source, and a projection stereoscopic display with higher efficiency and higher performance than that in related art is achievable.

Moreover, the stereoscopic display 1 has a configuration in which the first reflective liquid crystal panel 22A and the second reflective liquid crystal panel 22B are arranged in parallel and they reflect incident light, so compared to a stereoscopic display optical system in related art, a reduction in space for the stereoscopic display optical system is allowed, and unlike related art, it is not necessary for the polarizing beam splitter to have a function of distributing incident light to the reflective liquid crystal panels, so a reduction in the number of optical elements is allowed. Therefore, downsizing and a reduction in cost are allowed.

An effect of reducing the number of optical elements will be described in detail below referring to a configuration in which a laser light source is applied to a stereoscopic display optical system in related art as a comparative example.

COMPARATIVE EXAMPLE

Figure 7:
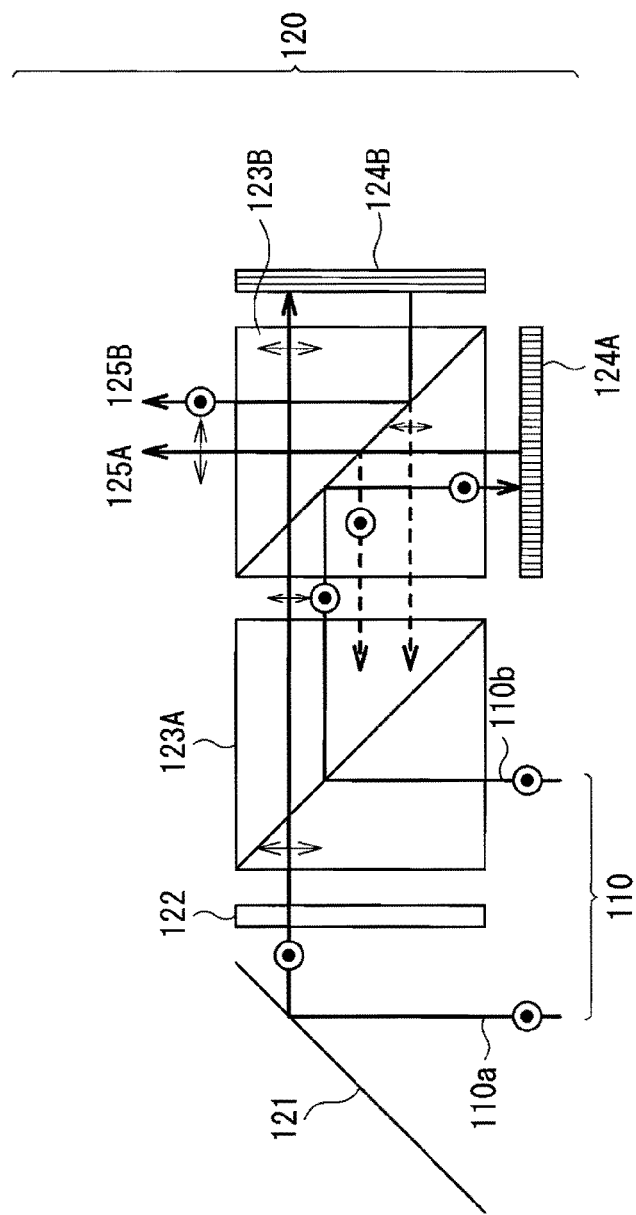
FIG. 7 is an illustration of a comparative example in which a laser light source is applied to a stereoscopic display optical system in related art.

FIG. 7 illustrates a stereoscopic display optical system 120 in related art. Laser light 110a and laser light 110b are polarized in a direction perpendicular to a paper plane. The laser light 110a is turned by a mirror 121, and then the polarization of the laser light 110a is converted into a direction parallel to the paper plane by a λ/2 wave plate 122, and the laser light 110a passes through a first polarizing beam splitter 123A. The laser light 110b directly enters into the first polarizing beam splitter 123A to be reflected in the first polarizing beam splitter 123A. As a result, laser light 110 which is turned into a non-polarized state by superimposing two components with orthogonal polarization directions enters into a second polarizing beam splitter 123B, and the laser light 110 is split again into two components to enter into a first reflective liquid crystal panel 124A and a second reflective liquid crystal panel 124B, respectively. Reflected light with polarization modulated by the first reflective liquid crystal panel 124A and reflected light with polarization modulated by the second reflective liquid crystal panel 124B are emitted from the second polarizing beam splitter 123B as a first picture 125A and a second picture 125B, respectively.

In the comparative example, to provide a function of distributing light to two panels to the second polarizing beam splitter 123B, it is necessary to convert incident light into a non-polarized state. Therefore, four optical elements, that is, the mirror 121, the λ/2 wave plate 122, the first polarizing beam splitter 123A and the second polarizing beam splitter 123B are necessary in addition to the reflective liquid crystal panels. On the other hand, in the stereoscopic display 1 according to the embodiment, it is not necessary to convert linearly polarized light into a non-polarized state. Therefore, the number of optical elements is reduced to three, that is, the first polarizing beam splitter 21A, the second polarizing beam splitter 21B and the λ/2 wave plate 24, thereby a reduction in manufacturing cost and downsizing of the stereoscopic display are allowed as described above.

APPLICATION EXAMPLE 1

Figure 2:
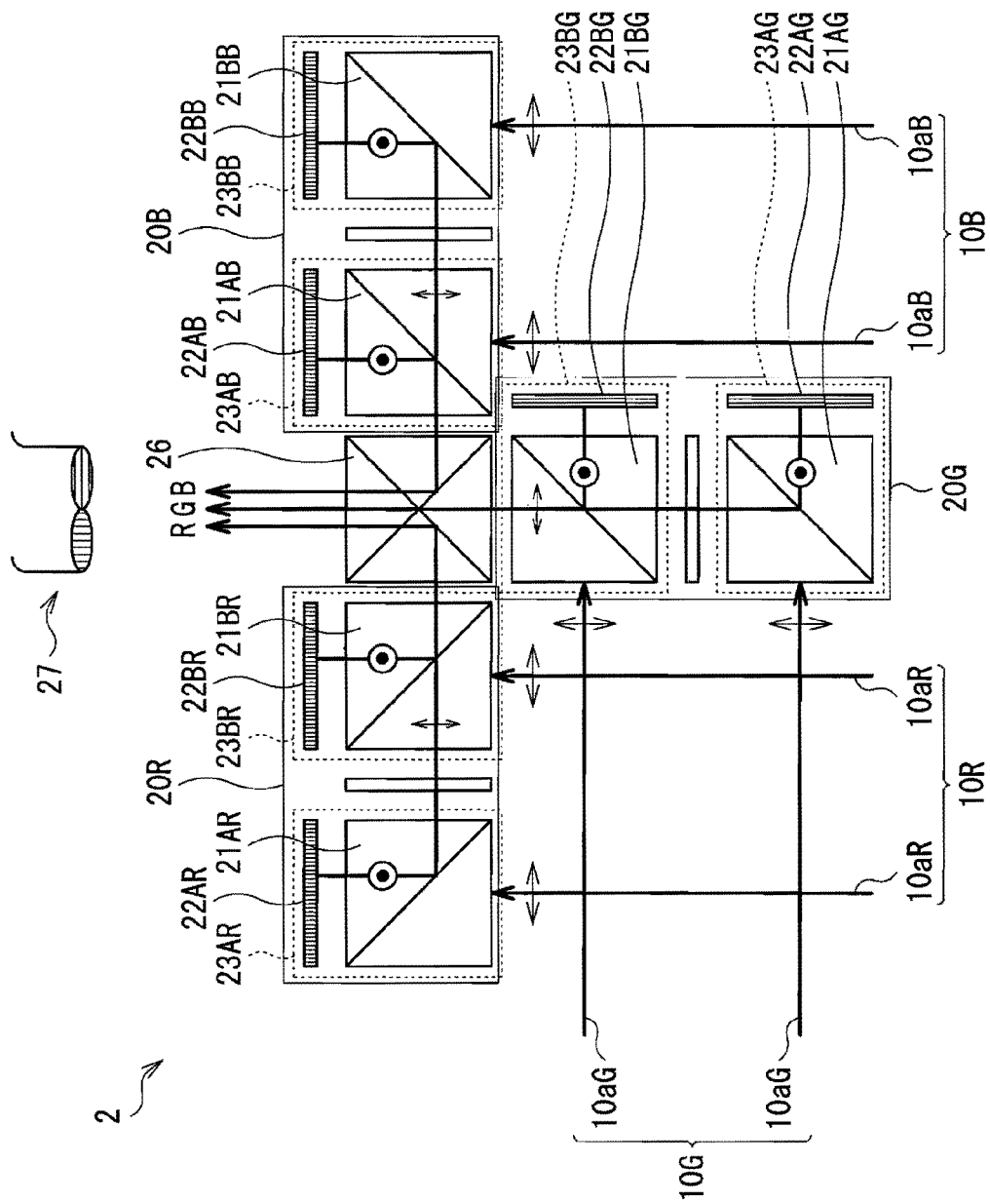
FIG. 2 is an illustration of a configuration of a stereoscopic display for color display.

A stereoscopic display 2 illustrated in FIG. 2 has a configuration in which stereoscopic display optical systems 20 in the above-described stereoscopic display 1 are combined to allow color display of three primary colors R (red), G (green) and B (blue). In this case, reference numerals for components are denoted corresponding to the colors RGB such as, for example, stereoscopic display optical systems 20R, 20G and 20B. The stereoscopic display 2 includes the stereoscopic display optical systems 20R, 20G and 20B and a multiplexing prism 26 for combining pictures of these colors emitted from the stereoscopic display optical systems 20R, 20G and 20B.

In other words, in the stereoscopic display 2, as in the case of the above-described embodiment, the stereoscopic display optical system 20R into which red laser light 10aR has entered emits a red picture formed by superimposing right and left pictures. Likewise, the stereoscopic display optical system 20G into which green laser light 10aG has entered emits a green picture, and the stereoscopic display optical system 20B into which blue laser light 10aB has entered emits a blue picture, and these three primary color pictures are combined by the multiplexing prism 26 to synthesize a color picture. Then, the synthesized color picture is viewable as a stereoscopic picture through, for example, a pair of polarized glasses 27. The color picture may be projected on a screen.

Second Embodiment

Figure 3:
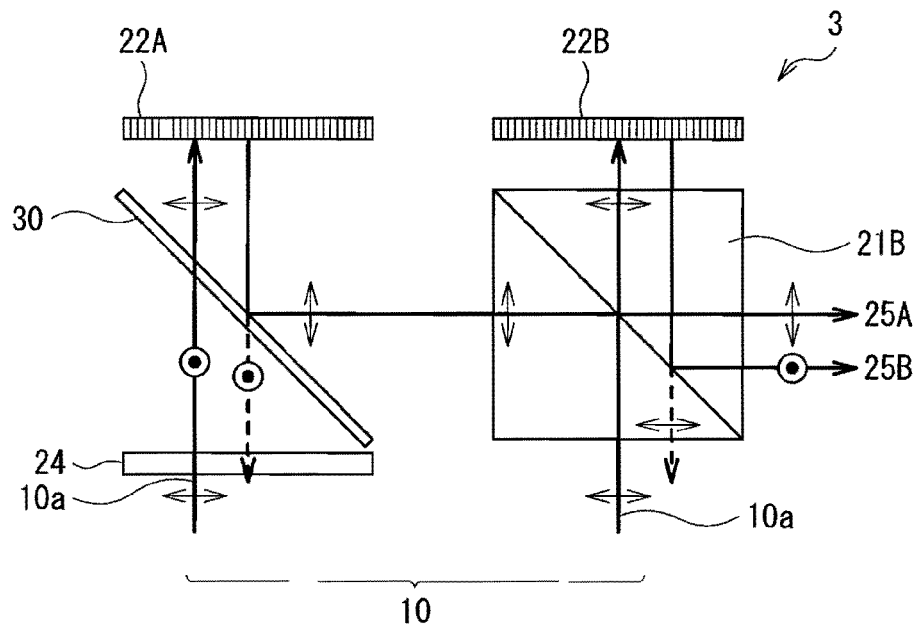
FIG. 3 is an illustration of a configuration of a stereoscopic display according to a second embodiment of the invention.

FIG. 3 illustrates a configuration of a stereoscopic display 3 according to a second embodiment of the invention. The stereoscopic display 3 has a configuration in which the first polarizing beam splitter 21A in the first embodiment is replaced with a wire grid polarizer 30, and the λ/2 wave plate 24 is arranged in a position anterior to the wire grid polarizer 30. Other configurations, and functions and effects are the same as those in the above-described embodiment. Very thin metallic wires are formed on a surface of the wire grid polarizer 30 in a direction parallel to a paper plane, and the wire grid polarizer 30 allows light with a polarization direction perpendicular to the paper plane to pass therethrough, and reflects light with a polarization direction parallel to the paper plane.

In the embodiment, before the laser light 10a enters into the wire grid polarizer 30, the polarization direction of the laser light 10a is converted by the λ/2 wave plate 24 so that the laser light 10a has the second linearly polarized component. The laser light 10a having the second linearly polarized component passes through the wire grid polarizer 30, and is modulated and then reflected by the first reflective liquid crystal panel 22A. The reflected light is polarization-split by the wire grid polarizer 30, and the reflected light having the first linearly polarized component is emitted as the first picture 25A. The first picture 25A is reflected by the wire grid polarizer 30, and then passes through the second polarizing beam splitter 21B, and is superimposed on the second picture 25B formed as in the case of the first embodiment to achieve stereoscopic display.

In addition, also in the embodiment, when the configuration illustrated in FIG. 2 is applied, projection stereoscopic display using three primary colors are achievable.

Modification 1

Figure 4:
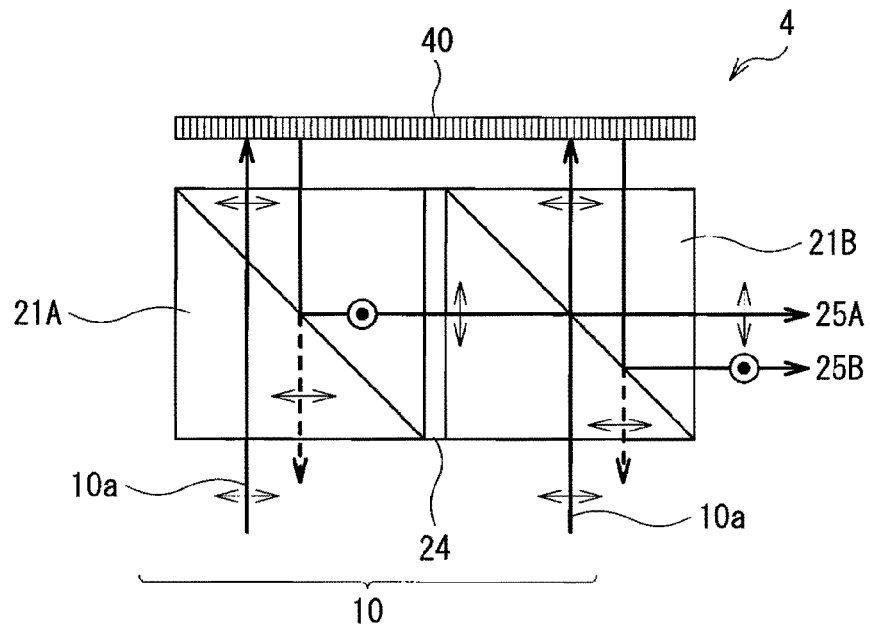
FIG. 4 is an illustration of a configuration of a stereoscopic display according to Modification 1.

FIG. 4 illustrates Modification 1 of the first embodiment. A stereoscopic display 4 has a configuration in which the first reflective liquid crystal panel 22A and the second reflective liquid crystal panel 22B are integrated to form a single reflective liquid crystal panel 40. Other configurations are the same as those in the first embodiment.

In such a configuration, in the stereoscopic display 4, a left-half region of the reflective liquid crystal panel 40 forms the first picture 25A, and a right-half region of the reflective liquid crystal panel 40 forms the second picture 25B, so that a drive circuit of the liquid crystal panel is simplified.

Modification 2

Figure 5:
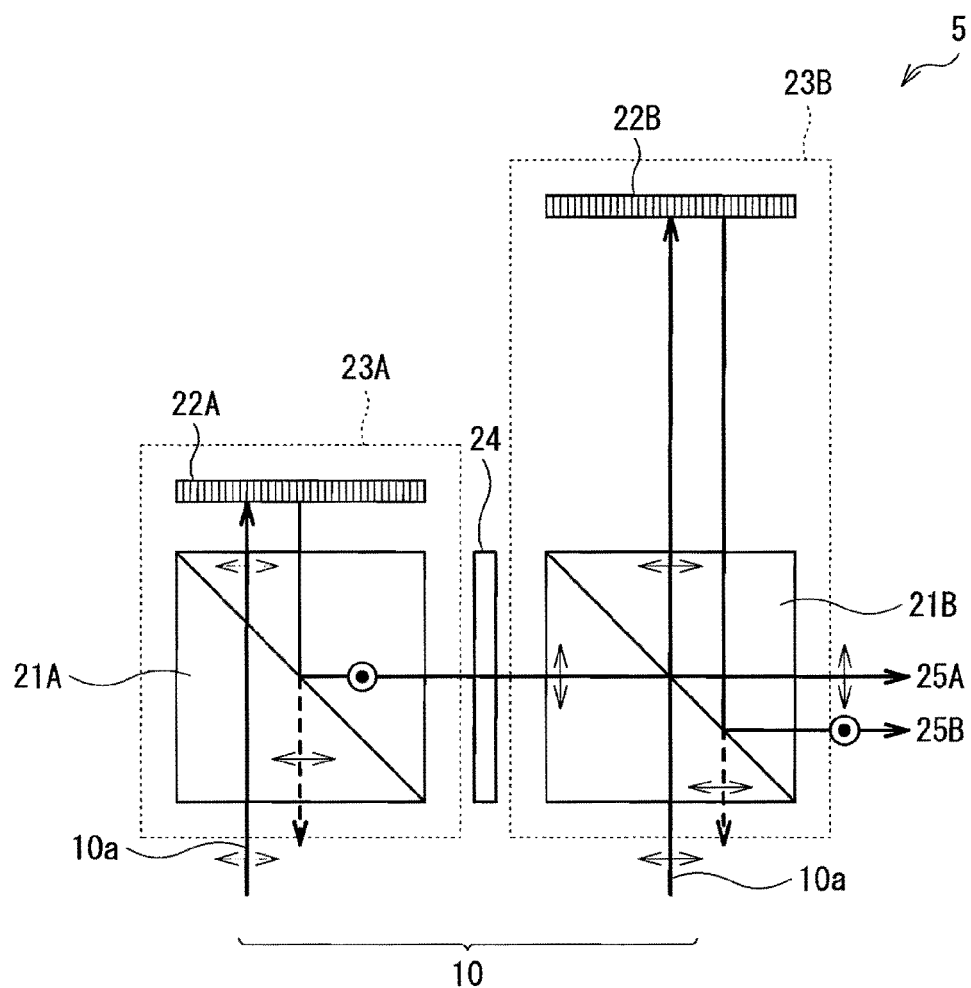
FIG. 5 is an illustration of a configuration of a stereoscopic display according to Modification 2.

FIG. 5 illustrates a configuration of a stereoscopic display 5 according to Modification 2. The stereoscopic display 5 has a configuration in which the second reflective liquid crystal panel 22B in the first embodiment is arranged in a position posterior to a position where the second reflective liquid crystal panel 22B is arranged in FIG. 1 so that a space between the second reflective liquid crystal panel 22B and the second polarizing beam splitter 21B is larger than a space between the first reflective liquid crystal panel 22A and the first polarizing beam splitter 21A. In such a configuration, in the stereoscopic display 5, the optical path lengths of the first picture 25A and the second picture 25B are equal to each other, and projection dimensions of both pictures easily match each other.

Modification 3

Figure 6:
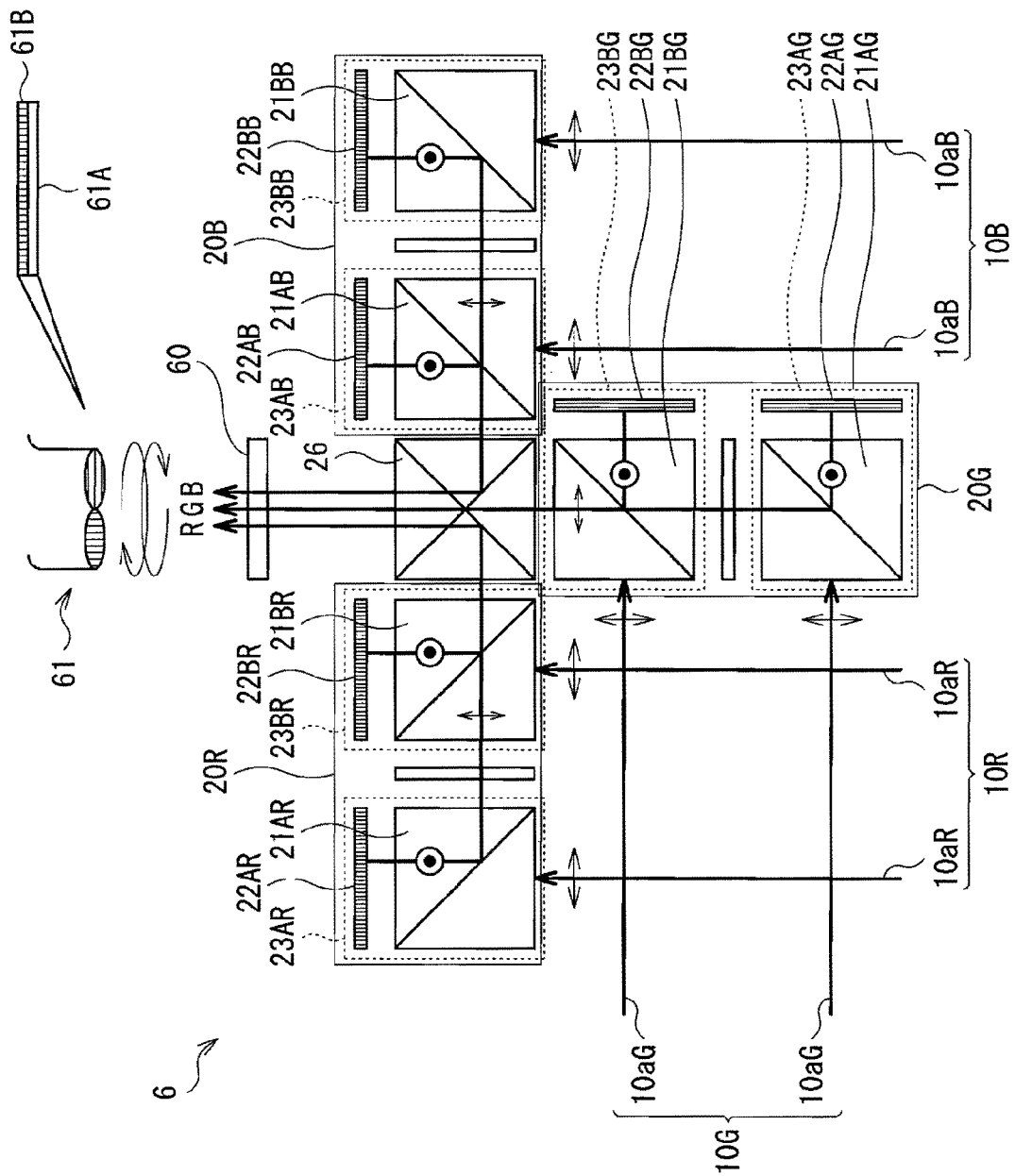
FIG. 6 is an illustration of a configuration of a stereoscopic display according to Modification 3.

FIG. 6 illustrates a configuration of a stereoscopic display 6 according to Modification 3. The stereoscopic display 6 has a configuration in which in the stereoscopic display 2 corresponding to color display illustrated in FIG. 2, a λ/4 wave plate 60 as a retardation device is added on an emission side of the multiplexing prism 26.

In the stereoscopic display 2 illustrated in FIG. 2, the first picture 25A and the second picture 25B as linearly polarized light orthogonal to each other are displayed. On the other hand, in the stereoscopic display 6, as the λ/4 wave plate 60 is used, the first picture 25A and the second picture 25B are converted into circularly polarized light with opposite rotation directions. In this case, as a pair of polarized glasses 61 for viewing, a pair of polarized glasses in which a layer functioning as a λ/4 wave plate 61A is added to a surface of a polarizing filter layer 61B may be used. In other words, in the pair of polarized glasses 61, by the λ/4 wave plate 61A, circularly polarized light from the stereoscopic display 6 (the λ/4 wave plate 60) is converted into linearly polarized light, and then the linearly polarized light is split into the first picture 25A and the second picture 25B by the polarizing filter layer 61B.

Thus, in the stereoscopic display 6, circularly polarized light is used, so even if the viewer's head is inclined, crosstalk due to leakage between the first picture 25A and the second picture 25B is avoided. Other functions and effects are the same as those in the first embodiment.

Although the present invention is described referring to the embodiments and the like, the invention is not limited thereto, and may be variously modified. For example, in FIG. 6, the stereoscopic display 6 for color display has a configuration in which circularly polarized light by the λ/4 wave plate 60 is used. However, the configuration may be applied to the stereoscopic displays 1 to 5.

The present application contains subject matter related to that disclosed in Japanese Priority Patent Application JP 2009-001433 filed in the Japan Patent Office on Jan. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projection stereoscopic display comprising:
   a light source operable to emit linearly polarized light; and
   a stereoscopic display optical system operable to receive linearly polarized light from the light source and display a first picture and a second picture both having binocular parallax by linearly polarized light with polarization directions orthogonal to each other,
   wherein,
   the stereoscopic display optical system includes
   (1) a reflective liquid crystal panel operable to modulate and reflect linearly polarized light from the light source in response to a picture signal,
   (2) a first polarizing device operable to split the first picture from reflected light from the reflective liquid crystal panel,
   (3) a retardation device operable to convert the polarization direction of the first picture into a direction orthogonal thereto, and
   (4) a second polarizing device operable to split the second picture from the reflected light from the reflective liquid crystal panel, and superimpose the second picture on the first picture of which the polarization direction is converted by the retardation device,
   the reflective liquid crystal panel includes a first reflective liquid crystal panel corresponding to the first polarizing device and a second reflective liquid crystal panel corresponding to the second polarizing device, and
   a space between the second polarizing device and the second reflective liquid crystal panel is larger than a space between the first polarizing device and the first reflective liquid crystal panel, and the optical path lengths of the first picture and the second picture are equal to each other.

2. The projection stereoscopic display according to claim 1, wherein
   the light source is three kinds of light sources corresponding to three colors of RGB,
   the stereoscopic optical system is three kinds of stereoscopic optical systems corresponding to the three colors, and
   the projection stereoscopic display includes a picture synthesizing means operable to combine pictures emitted from the three kinds of stereoscopic optical systems.

3. The projection stereoscopic display according to claim 1, wherein the reflective liquid crystal panel includes a first region performing modulation for the first picture and a second region performing modulation for the second picture.

4. The projection stereoscopic display according to claim 1, further comprising:
   a retardation device operable to convert the first picture and the second picture which are superimposed on each other in the second polarizing device into circularly polarized light with opposite rotation directions.

5. The projection stereoscopic display according to claim 1, wherein the light source is a laser.

* * * * *